United States Patent [19]

Maertins et al.

[11] 4,151,451
[45] Apr. 24, 1979

[54] GRAPHIC INPUT CONTROLLED AUTOMATIC POSITIONING SYSTEM

[75] Inventors: Horst Maertins, Berlin; Peter Rothfuss, Ditzingen; Gernot Maier, Stuttgart; Ulrich Stratemeier, Schwieberdingen, all of Fed. Rep. of Germany

[73] Assignee: Robert Bosch GmbH, Stuttgart, Fed. Rep. of Germany

[21] Appl. No.: 759,131

[22] Filed: Jan. 13, 1977

[30] Foreign Application Priority Data

Jan. 17, 1976 [DE] Fed. Rep. of Germany ....... 2601638

[51] Int. Cl.² .............................................. G05B 19/42
[52] U.S. Cl. .................................... 318/568; 318/577; 318/640; 250/202
[58] Field of Search ............... 318/568, 571, 577, 640, 318/480; 250/202

[56] References Cited

U.S. PATENT DOCUMENTS

| | | | |
|---|---|---|---|
| 3,241,021 | 3/1966 | Schmidt et al. ....................... | 318/568 |
| 3,426,258 | 1/1969 | Van Pelt ............................. | 318/640 |
| 3,502,880 | 3/1970 | Martinek et al. ................. | 318/577 X |
| 3,609,237 | 9/1971 | Gerber ................................ | 250/202 |
| 3,703,674 | 11/1972 | Doxey ............................. | 250/202 X |
| 3,840,739 | 10/1974 | Coultor ................................ | 250/202 |
| 3,859,517 | 1/1975 | Okuma .............................. | 318/577 X |
| 3,860,862 | 1/1975 | Dell et al. ............................ | 318/568 |
| 4,002,900 | 1/1977 | Sitenichenko et al. .............. | 318/577 |
| 4,074,642 | 2/1978 | Herr ................................. | 318/568 X |

*Primary Examiner*—B. Dobeck
*Attorney, Agent, or Firm*—Flynn & Frishauf

[57] ABSTRACT

An analog of a path through which a cross slide table, for example carrying a workpiece or a tool is to be moved is traced on a drawing sheet. At points of change of direction or commanded speed of movement, graphic machine-readable symbols are placed on the drawing. A sensor, with sensing elements located in the quadrants of an x–y coordinate system, preferably secured to the cross slide itself, is placed above the graphic drawn representation of the movement path, the graphic representation is introduced by means of a program carrier beneath the cross slide and, upon recognition of symbols representing change of direction, speed of movement, suitable signals are derived which control servo motors moving the cross slide and the sensor in accordance with the sensed signals picked up by the sensor from the graphic representation of the movement immediately beneath the cross slide table itself, thus avoiding the necessity of numerical or other programmed input to the cross slide.

16 Claims, 8 Drawing Figures

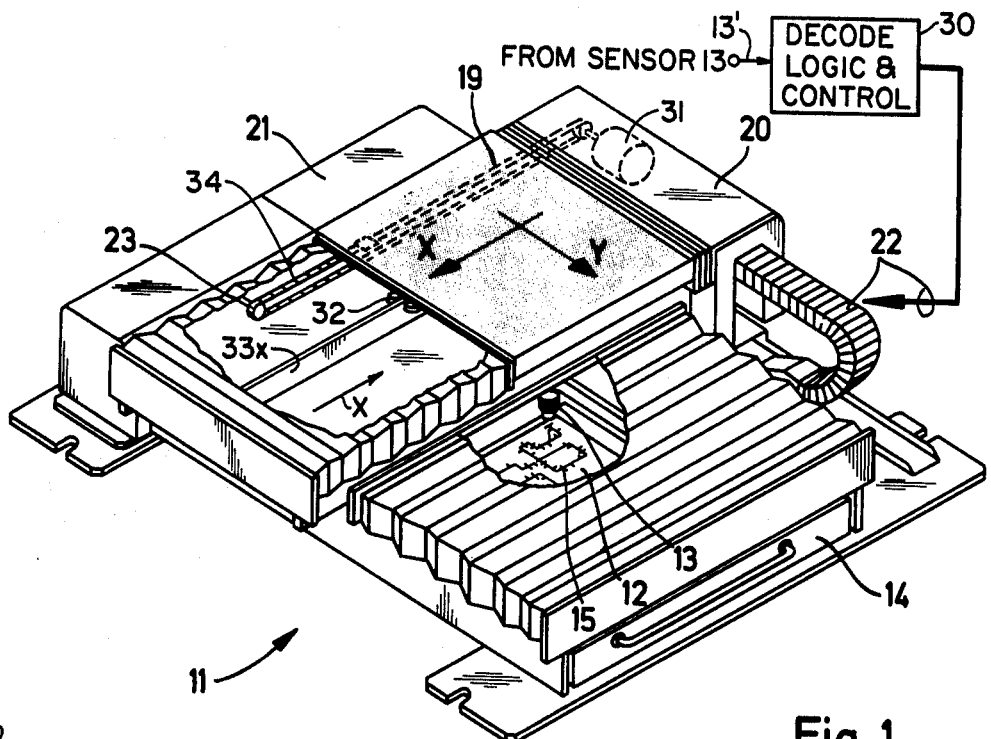
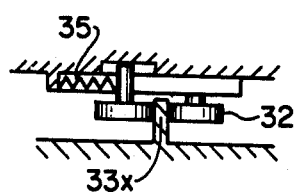
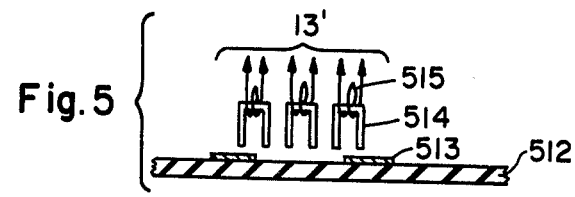
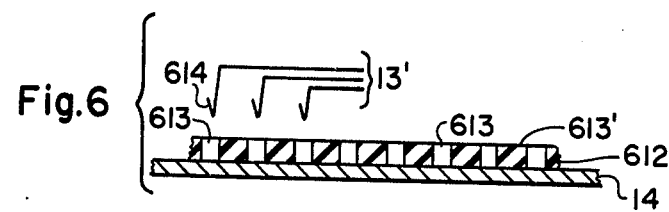
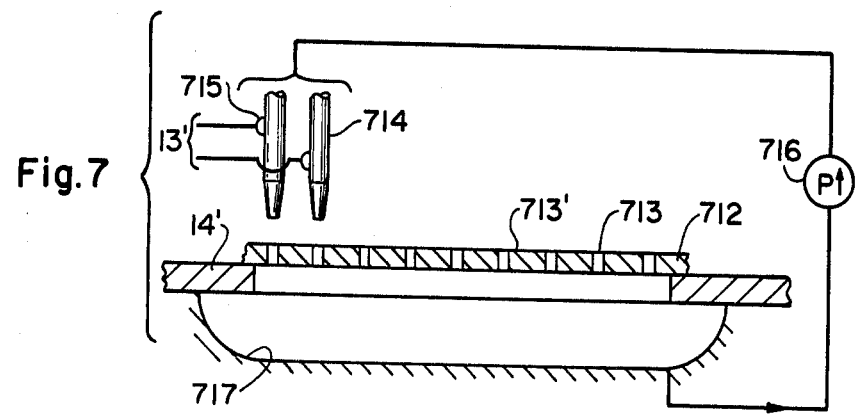

GRAPHIC INPUT CONTROLLED AUTOMATIC POSITIONING SYSTEM

The present invention relates to an automatic positioning system positioning a workpiece or a tool under command of a program in sequential positions, in space, and more particularly in sequential positions in an x-y coordinate system.

Many positioning systems have been proposed and are known. They are widely used in industry and are available in many forms for many industrial suppliers. Generally, they are used to feed or remove workpieces or tools, place tools or workpieces, and position tools or workpieces in predetermined positions along a working path. Such positioning systems are particularly suitable to remove heavy physical loads on human operators, particularly in serial mass production. When manufacturing in large quantities or mass production, automatic positioning system can remove the monotony of repetitive work from the human hand, thus leading to improvement in efficiency in the overall manufacture, and a better work satisfaction on part of those operators of the machines and who will not be forced to carry out repetitive steps without application of their own initiative. Thus, automatic positioning and locating systems not only have utility in industry where there is scarcity of personnel or material or tools have to be placed in hazardous or potentially dangerous surroundings; they have, further, the sociological basis of avoiding monotonous, repetitive mind-deadening work.

Many positioning systems use, basically, these components: a motor drive, frequently arranged in x-y or polar coordinate systems, a control unit, path or distance measuring system, a holder or gripper, and a movement controller. Overall, such systems are complicated and require highly skilled installation and maintenance. The drive for the particular positioning system usually is pneumatical, hydraulical or electrical. The positioning commands are frequently given as point commands, that is, locating a tool or a particular point on a workpiece - hereinafter collectively called "locating the device" - at a specific point on the selected coordinate system. When the device is properly positioned, the respective tools or workpieces are brought into engagement at precisely defined positions for working the workpiece. The path which the device takes between working positions is usually irrelevant. A distance measuring system is needed to permit exact positioning of the device at the commanded position and then to move it to the next subsequent commanded position. Suitably applied controls permit placing the device at any desired point in space, if the coordinate system is a three-dimensional one. In three-dimensional systems it is usually sufficient if the carrier for the device has three degrees of freedom; in plane systems, two degrees of freedom, for example in x-y coordinate directions with respect to a base point, are sufficient.

Special grippers or holders are usually used to the device; in some cases, the grippers or holders can be furnished with sensors which recognize the nature of the device, or the nature of the tool or workpiece approaching the device.

The sequence of positions which the device is to take is commanded by a predetermined program. This requires that the sequence of the various programming steps has to be determined. Various methods for programming have been developed. The control itself can be done pneumatically, for example by fitting a pneumatic program on a coded card formed with holes or grooves, in the system generally known as "fluidics". The program can be effected also by suitable duct connection, electrically by a patch board, connecting cards or the like; mechanical control can be effected by cams, cam drums, punch cards, punched strips, and punched tape. Magnetic tape control and various other input-output devices may also be used. All these types of programming have the single disadvantage that they require complex and expensive input-output equipment and, primarily, highly skilled programmers to write the program, debug the program, and, once written and placed in operation, highly skilled maintenance and repair personnel.

It is an object of the present invention to provide a program controlled positioning system which is so constructed that it can fully automate various processes by positioning a device in a certain point in space, so that devices, repetitively, can be placed at the predetermined location, and particularly sequences of locations, in space, for engagement with suitable machine tools, processing, or the like. The program should be simple to make, easy to change, readily interchangeable with different programs and, primarily, not require the effort of skilled numerical programmers.

SUBJECT MATTER OF THE PRESENT INVENTION

Briefly, the program is reduced in diagrammatic, graphic form on a program carrier by placing machine-readable, recognizable discrete symbols thereon, the symbols representing commanded movement, its presence or absence, or change, both regarding direction as well as speed, which forms a graphic representation of the desired movement of the device. The symbols are placed in positions analogous to the position the device is to take on a workpiece, movable in two or more coordinates, the symbols being connected by lines between adjacent symbols representative of immediately successive commands, the lines themselves representing the path of movement to be taken. This carrier is associated with a sensor, preferably coupled directly to a movable table, which has sensing elements located thereon which sense the symbols, the sensor being connected to a decoding logic and control system which decodes the symbols and then controls suitable servo motors to move the carrier table in the required direction, at the commanded speed, as controlled by the specific symbol. Preferably, the sensor includes four discrete sensing elements or, more desirably, four arrays of sensing elements located in quadrants of an x-y coordinate system.

The respective movement of the device is thus commanded by locating the device on a movable table, typically a cross slide, the movement of which is controlled by the sensors. The program carrier is an analog of the desired sequence of movements of the table. This arrangement has the specific advantage over numerically controlled movements or other systems, that the program is very simple to prepare and is readily checked; it is a graphic representation which is directly humanly readable, indicating the sequence of programming steps available for immediate human inspection. The program carrier itself - typically a sheet of drafting paper on which the sequences of programmed positions are indicated by symbols, connected by lines, can be located on a holder which is positioned directly below the work table. This ensures accessibility and ready alignment of the cross slide with the commanded position. The program can be changed at any time by merely replacing the particular sheet with the movement diagram thereon by another one. This is a substantial simplification with respect to numerically programmed systems, permits control of the position by visual inspection of the program and results in substantial simplification of the overall system. The simplification is obtained not only with respect to the programming itself, but also with respect to service, maintenance, and first cost. The programming system itself is a unit which can be made separate and apart from a cross slide carrying workpieces or tools, and thus is a separate independent system which can be associated with any one desired workpiece or tool carrier.

In accordance with a preferred embodiment, the table is a cross slide table, and commanded positions are defined as points on a Cartesian or x-y coordinate system.

If the movement and its direction occur only in a single plane, for example an x-y plane, the table, preferably a cross slide table, can be shaped in a suitable and standard manner to receive tools or workpieces; any forces which arise upon machining are exerted usually primarily perpendicularly to the direction of movement of the cross slide table, so that that the forces necessary to move the cross slide table can be small and the accuracy of movement excellent.

Preferably, the programming carrier is located beneath the cross slide table with an interchangeable program insertion holder. This permits rapid and simple exchange of programs if a different sequence of steps is to be carried out. The specific location of the programming carrier beneath the work table saves space and furthermore provides for a protected location of the program in a machine shop environment.

The invention will be described by way of example with reference to the accompanying drawings, wherein:

FIG. 1 is a schematic, perspective view of the automatically programmed positioning system, using an optical programming and control system; with the top partly broken away FIG. 1A is a fragmentary detail view of the guidance system for the X axis looked at in the direction of the arrow X of FIG. 1;

FIG. 5 is a highly schematic representation of a capacitative or inductive sensing system using electrical conductors rather than light guides;

FIG. 6 is a highly schematic representation of a mechanical sensing system; and and FIG. 7 is a highly schematic showing of a sensing system using fluidics, pneumatic or liquid, to sense programming paths and to control the apparatus of FIG. 1.

Figure 4:
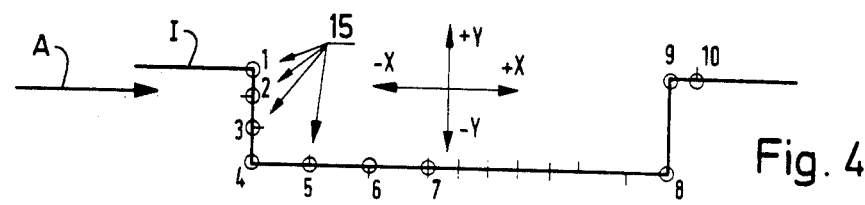
FIG. 4 is an illustration of a program for a particular sequence of paths to be carried out by the cross slide table of the apparatus of FIG. 1.

The control positioning system - FIG. 1 - generally includes a cross slide 11 forming a carrier for the device to be positioned, and an optical scanning sensor 13 which is mechanically coupled to the cross slide, to be movable, for example, in the x-y direction. It may be directly secured to the cross slide table 11. The program itself is drawn on a two-dimensional program carrier 12 which is introduced beneath the sensor 13 by an insertion slide 14, which is removable from beneath the cross slide table 11. Forming the holder 14 for the program carrier 12 as a slide located beneath, and preferably immediately beneath the cross slide table 11 as such, ensures rapid exchange of the program carrier 12. The program carier 12, itself, may be a blueprint, a schematic engineering drawing on engineering carton, or the like, secured to a metal plate, or may be a metal plate directly. The program itself is drawn in lines and symbols. The symbols form code signals 15 (FIG. 4) connected together by lines, as best seen in FIG. 4. FIG. 1 further shows a mounting surface 19 for the devices - tools or workpieces - to be positioned. The cross slide table 11 includes an x-axis drive 20 as well as y-axis drive 21, operated by two brake motors having a slow speed, only motor 31 for the X direction being shown for simplicity and a high speed. Separate motors may be provided for slow-speed and high-speed operation instead. The motors, preferably, are d-c servo motors having a built-in brake, and using gear belts 34 and sprockets as transmission elements for accurate transmission of motion. FIG. 1 further illustrates the power supply 22 to the motors for the x- and y-axes positioning, as well as bellows 23 which protect the slide drive.

The drive of the cross slide support 19 preferably includes two perpendicularly arranged rails or tracks of which only rail 33X is visible on which the slide table can move to assume any desired position within the selected coordinate system. Sliding movement driven, for example, by worm and rack transmissions from the motors in the x-y direction drive, is preferred. Accuracy of positioning is maintained by providing, internally, spring pressed rollers 32 laterally pressing the table against one of the slide or guide rails so that engagement of the moving elements with the slide table will always be with respect to a predetermined flank of engaging gearing and similar drive elements as schematically shown by spring 35 pressing the shaft of one roller 32 in a lateral direction.

Figure 2:
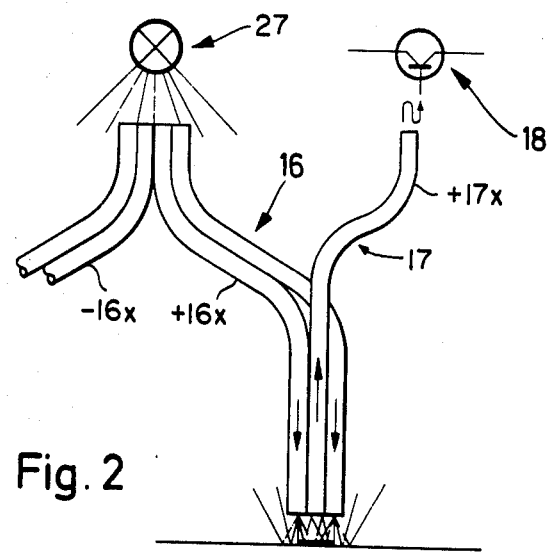
FIG. 2 is a schematic representation, in side view, of an optical sensor.
Figure 3:
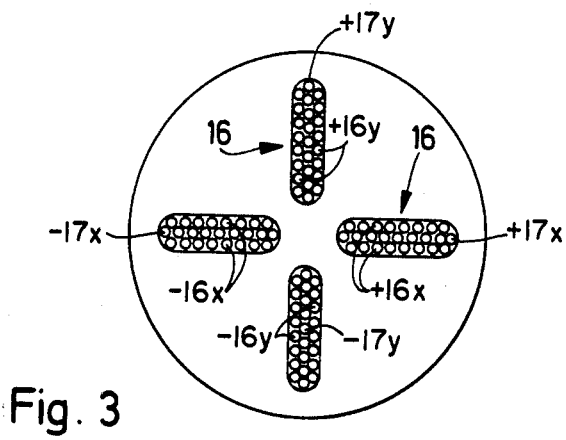
FIG. 3 is a bottom view of the optical sensor of FIG. 2.

The optical sensor and its operation are best seen with respect to FIGS. 2 and 3: A light guide system 16 is exposed to illumination from a light source 27. The return line is in light-transmitting relationship to a photo sensor, e.g. transistors 18, which senses the code signal 15 drawn on the program carrier 12 and converts the respective code signal into electric pulses. FIG. 4 illustrates a program for a predetermined sequence of movements and operations of the cross slide 11 using a plurality of code signal schematically illustrated at 1 to 10.

The light guide system 16 includes four separate branches, $-16x$, $+16x$, $-16y$, $+16y$, arranged as shown in FIG. 3. A group of individual light guides provide strips of illumination in the positive and negative x- and y-axes. Intermediate the illuminating light guides is a separate light guide 17, also arranged to decode signals in the minus and plus x and y axial directions, and shown, schematically, at $-17x$, $+17x$, $-17y$, $+17y$. The return light guides are collectively schematically shown at 17 in FIG. 2, and each one of the individual light guide elements, as seen in FIG. 3, are associated with a single photo transistor. The outputs of all the photo transistors -collectively shown at 18 in FIG. 2 - are connected over a line 13' to decode logic and control unit 30: Decode logic and control unit 30 analyzes the signals derived from the individual transistors associated with the individual light guide elements of the four groups of return light guides $-17x$, $+17x$, −17y, +17y, and provides decoded output signals in accordance with the particular sensed symbol.

The positioning apparatus can be used, for example, for the following processes: drilling of holes with predetermined configuration, positioning of solder pins, connecting flags or lugs on printed circuit plates and the like, insertion of elements, conductors, and the like, soldering at predetermined positions on a workpiece, a printed circuit board, or the like, spot-welding, etc.

Operation, with reference to FIG. 4: A program carrier is prepared by graphic represention on the prgram carrier 12 with respective lines and code signal symbols 15, the lines determining the direction of movement of the cross slide 11, and the symbols 15 determining change in direction and speed - incuding stopping. The number and position of the responding photo transistors 18 is determined by the decode logic and control unit 30. If only two photo transistors 18 respond, then the respective line is to be followed. If more respond ,then the additional response indicates sensing of a control, or code signal symbol. FIG. 4 shows, by way of example, a program which can be carried out by the cross slide 11. The lines which connect prositions of the cross slide table are supplemented by symbolic representations of commands for the respective motors in x and y cross slide controls 20, 21, commanding for example rapid movement, stopping, slow movement, reversal, and the like.

The program of FIG. 4 represents the following: Let it be assumed that, initially, the cross slide is being moved manually along the line I in the direction of arrow A, FIG. 3. Automatic operation is to start at point 1.

Point 1: change direction +x to direction −y
2: engage fast-forward speed
3: terminate fast-forward speed
4: change direction from −y to direction +x
5: engage fast-forward speed
6: terminate fast-forward speed
7: stop; start workoperation
8: change direction: +x to +y
9: change direction: +y to +x
10: engage fast-forward.

Various other programming symbols can, of course, be generated. As can be seen, the symbols are easy to draw, can readily be prepared by draftsmen, can be easily corrected, and can be easily changed. The apparatus can be so set that, normally, it operates at low speed, unless an "engage fastforward" command is sensed; the "stop" command - point 7 - can be used to simultaneously trigger or initiate a working operation as above described, for example soldering, insertion, drilling, or the like; or, alternatively, an additional symbol can be provided which controls the particular operation to be carried out.

If the photo transistors 18 associated with light guides of one axis, e.g., the light guides −17x and +17x respond, the head 13 will continue to follow the line. When one of the sensors in one quadrant, for example, −17x and one of the sensors in another quadrant, for example, −17y responds, then this is an indication of change in vectorial direction of movement - see point 1 above. When three sensors respond, then the third reponse in a third quadrant is an indication that the main direction is to be maintained, but that an operating condition command is also sensed, for example, a change in operating condition - see point 2, 3 above. It is possible to use cross lines. A "stop" command is, preferably, caused if all photo transistors 18 in all four axes, that is, the photo transistors exposed to all of −17x, +17x; −17y, +17y are triggered. The "stop" command can be interlocked to assure safety of the apparatus with respect to a preceding command, so that it will be obeyed only if a preceding command "terminate fast speed" has been sensed (points 3, 6 above). Likewise, change of direction would be carried out only if the cross slide is moving at slow speed to prevent jarring and damage. Suitable interlocks and short-time memory circuits can be provided for that purpose. Since these elements would form part of the unit 30, the programming thereof need not be changed if the sequence of programming steps is changed. A simple, preset interlock circuit would suffice.

The sensor of FIGS. 2, 3 need not be constructed only with four units in the respective positive and negative x- and y-axes directions. Increasing the number of groups of sensors to eight, located in octal position, increases the possibility for programming and command and also permits simultaneous movement in two axial directions, for example a direct diagonal path, thus reducing positioning time if longer distances have to be convered, at the cost of increased complexity.

The program carrier 12, in the form of graphic representation of lines and symbols, is located in the programming insertion device 14 beneath the cross slide table 11. Preferably, sensor 13 is directly connected to the cross slide 11. Thus, sensor 13 will scan the lines and codes which are drawn on the carrier 12 as the cross slide 11 moves. The sensed graphic representation is converted to electrial signals by the sensors which are applied to the decode logic and control unit 30 (FIG. 1). Movement of the cross slide 11 in the x- and y-axes direction will follow the sequence of steps, changes in direction, speed (including stopping) and other symbolically commanded program steps in accordance with the graphic representation of the program on the carrier 12. The cross slide 11 will move accordingly on its perpendicularly arranged slide guides or rails, driven by the respective motors in the x and y control unit 20, 21.

The structure of the present invention provides automatic positioning system which is extremely simple to program. Further, the program itself can be readily changed, can be interrupted at any time, a new program inserted even in the middle of a previous program without intervention of computertrained personnel. The program itself can be prepared by any draftsman who has in front of him no more than a table of the symbols used.

In a preferred form of the invention, the program is sensed by an optical sensor which is mechanically coupled to the cross slide table 11, especially directly connected thereto, as shown in FIG. 1. Thus, movement of the cross slide table and the scanning sensor is automatically simultaneous and accurately synchronous, and further permits drafting of the program on the carrier in a 1 : 1 scale, so that the program carrier 12 will, directly, provide a representation of the movement to be carried out by the device on the cross slide 11. This is of substantial advantage in checking the program. The graphic code signals applied thereto can be prepared from patterns, or any technical draftsmen can learn them quickly, so that the program can be read off the drawn program sheet by others, for example the machine operators, and checking of the actual sequence of movement of the device on the cross slide table with respect to the commanded program requires no more than a visual comparison. This is possible due to the graphic representation of the program on a plane program carrier.

The graphic code signals on the program carrier permit command of any desired movement of the cross slide table. Thus, the cross slide table can move fast or slow in either coordinate direction and, additionally, provide for stopping, and initiation of machining, or other working steps.

In a preferred form of the invention, the sensor includes at least four groups of light guides arranged as shown in FIG. 3. The fineness of the light guides and their number in the x and y direction will determine the resolution of the symbols, and the type of symbols which are, for example, to be used. FIG. 4 illustrates circles with lines extending in the one or other direction from the connecting, or "running" line connecting the various points. This is one of the simplest graphic representations resulting in high rejection of ambiguity. Exact optical scanning of the code signals is thus possible by optically interrogating the symbols drawn on the program carrier 12.

FIG. 5 is a highly schematic fragmentary representation of a program carrier 512 on which a metallic deposit 513 is applied, for example in the form of magnetic ink which is premagnetized; the drawing is shown highly exaggerated and the carrier 512 and ink 513 may be applied, for example, similarly to the magnetic printing by the MICR (Magnetic Ink Character Recording) code form. The portions of magnetized ink are sensed by closely located scanning gaps 514 which are connected to sensing coils 515, coupled together to a cable connected to the terminal 13' of decode logic and control unit 13. If the gaps 514 are directly electrically connected to the lines 515, the pick-up can be capacitive with respect to the base plate of the insertion carrier slide 14 (FIG. 1) on which the carrier 512 is located. The arrangement of the symbols in accordance with FIG. 5 is similar to that shown in FIG. 4, and the gaps 514, or electrically conductive sensing heads can be arranged similar to the light guides 17, as shown in FIGS. 2 and 3.

Mechanical sensing is also possible in that the carrier 612 is perforated in accordance with the lines and symbols as shown in FIG. 4, the perforations being sensed by spring wires 614 moving, or making electrical contact with selected openings, as shown in exploded form in FIG. 6 where holes 613 extend through the program carrier 612, but failing to move where a solid portion 613' of the carrier 612 appears. The spring clips 614 would, again, be arranged similar to the light guides 17 as shown in FIG. 3, in the respective axes or, if more resolution is required, in octal configuration.

Fluidic systems may also be used; a carrier 712, formed as a punched or perforated pattern and carrying the symbols as shown in FIG. 4 is prepared. The carrier may be a plastic sheet or the like which, again, can be read by visual inspection. Pressure fluid is introduced through fluidic nozzles 714 through openings 713 in the program carrier 712. Where the nozzles match openings 713, the pressure fluid can flow uninterruptedly through the support carrier 14' to a sump 717, to be re-circulated by a pump 716 to the nozzle 714. If, however, the nozzles are not in alignment with an opening 713, a back-pressure will arise which is sensed by pressure sensors 715, to be applied as electrical signals over line 13' to the decode logic and control unit 30.

Various changes and modifications may be made, and the sensor itself can be matched to the particular requirements, to the accuracy of the program, and to the number of symbols to be decoded. The decoding of the symbols and of the output signals available at line 13' is known, and reference can be made, for example, to the decoding of signals by correlation, e.g. signals derived from check reading apparatus, or optical character recognition apparatus. The present invention permits one-to-one representation of a program sequence to be carried out by easily recognizable and learned symbols in which a programming path is graphically represented, with steps for speed, direction, change in direction, change in speed (including stopping) and working steps symbolically indicated in human recognizable and readable form, simultaneously readable and recognizable in machine readable form.

The present invention is also applicable to three-dimensional positioning, for example by locating two tables similar to the apparatus described in two perpendicular planes, one table forming the device secured to the other, the one table then carrying the device, be it a tool or a workpiece. Two program carriers would then be used, each one representing movement in the respective two-dimensional plane of the respective table. Other positioning devices, capable of placing an object at a predetermined position, with respect to a reference, in space, can be used if they can be suitably controlled by servo motors operating in two perpendicularly arranged planes, and controlled similarly to the control of a cross slide table, as explained.

We claim:

1. Controlled automatic positioning system to locate a device in a particular position in space, in accordance with a recorded program, and signals derived from said program, comprising a two dimensional program carrier (12) having a program recorded thereon in form of optically recognizable separate symbols representative of (a) a commanded path of the device between immediately succeeding commands and illustrated by connecting lines between adjacent symbols, and (b) commanded operating conditions including presence or absence of movement, or change of movement of said device, a movable support (11) movable in two directions in accordance with a Cartesian system;

drive power means (20, 21) coupled to the support to move the support in said directions;

sensing means (13) comprising at least four sensing elements (18) located in quadrants with respect to the Cartesian coordinate system, positioned in sensing relation to said program carrier and sensing the respective separate symbols, said sensing means moving in synchronism with movement of said movable support (11) as commanded by the signals derived from the program, the program being an analog of the movement to be carried out by said support (11) as driven by said drive power means (20, 21);

said symbols representative of commanded operating conditions being additonal to the symbols representative of said commanded path of the device and positioned in quadrants with respect to said Cartesian coordinate system other than the symbols representative of said commanded path;

and decode logic and control means (30) connected to receive signals from the respective sensing elements (18) representative of sensed information at the respective quadrants derived from said program, decoding said information with respect to commands represented by respectively sensed signals, and controlling said drive power means (20, 21) to control movement and direction of the support in accordance with the program, whereby, when the decode logic and control means receives signals from two sensing elements only, data are being presented thereto indicative of direction of movement, while, if the decode logic and control means receives signals from more than two sensing elements, data are being presented thereto indicative or presence of an operating command due to the presence of signals from a quadrant additional to the signals from the connecting lines.

2. System according to claim 1, wherein, said symbols are graphically representative of changes in speed or direction of said path of movement.

3. System according to claim 1, wherein said support is a table of the cross slide type (11, 19).

4. System according to claim 3, wherein said sensing means (13) is secured to the bottom of the table (11, 19) to move conjointly therewith.

5. System according to claim 3, wherein the respective separate signals represent change points with respect to at least one of: direction; speed of movement of said cross slide-type table.

6. System according to claim 1, wherein said support comprises a table of the cross slide-type (11,19) having a top surface to locate said device thereon;
the program carrier (12) is a flat sheet;
and a movable program carrier holder (14) is provided located beneath the table to locate replaceable program carriers thereon and place a selected program carrier in position beneath the table.

7. System according to claim 6, wherein said sensing means (13) is secured to the bottom of the table (11, 19) to move conjointly therewith.

8. System according to claim 1, wherein said support means comprises a table of the cross slide type, the cross slide including a pair of d-c motors, and positive drive means couple the d-c motors to the cross slide table; and perpendicularly arranged tracks to quide movement of the cross slide table.

9. System according to claim 8, wherein said sensing means (13) is secured to the bottom of the table (11, 19) to move conjointly therewith.

10. System according to claim 1, wherein the sensing means comprises an optical sensor (13) having at least four groups of light guides including light transmission sections (16) and light receiving sections (17) in each group;
an illuminating means (27) in light-transmitting relation to the light transmission sections (16);
and a group of photosensitive semiconductor elements (18) in sensing relation to the light-receiving elements of the groups of light guide systems;
and wherein the program carrier comprises a sheet-like carrier having optically contrasting symbols and connecting lines applied thereto.

11. System according to claim 10, wherein said sheet-like carrier comprises drafting paper and the symbols, as well as the connecting lines, are applied to said drafting paper in optically highly contrasting form.

12. System according to claim 1, wherein said program carrier comprises non-magnetic material, said symbols and connecting lines comprise magnetically responsive ink applied to said program carrier, and said sensing means includes inductive means in electromagnetic sensing relation to said magnetic ink.

13. System according to claim 1, wherein said program carrier comprises insulating material, said symbols and connecting lines comprise an electrically conductive coating on said insulating material, and said sensing means comprises capacitative pick-up means in capacitative relationship to said program carrier.

14. System according to claim 1, wherein said program carrier comprises a sheet-like carrier material, the symbols and connecting lines being represented by surface discontinuities thereof;
and said sensing means comprises mechanical pick-up means responsive to said surface continuities and generating corresponding electrical signals.

15. System according to claim 1, wherein said program carrier comprises a sheet-like element formed with apertures therethrough, the apertures being arranged on said sheet-like element to represent said separate symbols and said connecting lines;
and wherein said sensing means comprises fluid sensors in pressure-transmitting relation to said program carrier and sensing presence or absence of an aperture beneath the sensing means.

16. System according to claim 1, wherein said program is a graphic analog of the path of movement through which said support (11) is being moved by said drive power means (20, 21) the direction of said path of movement, as graphically represented by said symbols being indicated by lines extending in two quadrants of said Cartesian coordinate system, and the symbols representative of commanded operating conditions being graphically represented in quadrants additional to the quadrants occupied by the symbols representative of the path of movement.

* * * * *